April 28, 1970   B. J. LOUGHLIN ET AL   3,509,390
VARIABLE RELUCTANCE DISC, RECIPROCATING, AND ROTARY STEPPING
MOTORS AND RESOLVERS Filed May 29, 1967   2 Sheets-Sheet 1

April 28, 1970  B. J. LOUGHLIN ET AL  3,509,390
VARIABLE RELUCTANCE DISC, RECIPROCATING, AND ROTARY STEPPING
MOTORS AND RESOLVERS
Filed May 29, 1967  2 Sheets-Sheet 2

United States Patent Office

3,509,390
Patented Apr. 28, 1970

1

3,509,390
VARIABLE RELUCTANCE DISC, RECIPROCATING, AND ROTARY STEPPING MOTORS AND RESOLVERS
Bruce J. Loughlin, South Acton, Ervin J. Rachwal, Framingham, and Murray M. Schiffman, Newton, Mass., assignors to Data Technology, Inc., Watertown, Mass., a corporation of New York
Filed May 29, 1967, Ser. No. 641,864
Int. Cl. H02k 33/00, 35/00, 37/00
U.S. Cl. 310—15　　　　　　　　　　　　　53 Claims

ABSTRACT OF THE DISCLOSURE

Variable reluctance multi-phase motor and resolver apparatus including a structure for providing two distinct flux paths, the structure having a stator and a rotor each of which has two sets of teeth axially spaced from each other for varying the reluctance of the air gap between the stator and rotor, the sets of teeth on the stator are out of phase with respect to each other and an electrical winding mounted on the stator provides magnetic flux transverse to the direction of motion of the rotor in the two flux paths. A sensing winding may be used to sense the magnetic flux in both flux paths and the sensing winding may have two sections for separately sensing the flux in each flux path. The apparatus includes disc, reciprocating, and rotary stepping motors and resolvers, and in the latter the energizing windings may be replaced with permanent magnets.

SUMMARY OF INVENTION

This invention relates to variable reluctance transducing apparatus and more particularly to an improved such apparatus adaptable for use in a position encoder or stepper.

Conventional magnetic transducers used for stepping or for sensing the position of related equipment require a plurality of individual and relatively movable members for precision performance. Some such devices require a number of individual energized poles, others a plurality of members with respect to which the poles or cooperating members are relatively movable. In those using a plurality of poles the number of effective magnetic paths between the poles and cooperating members is limited by the expense and difficulty of constructing and winding the small, individual poles. The fewer the number of poles in such devices, the less discrete are the positions for sensing and stepping and the fewer the number of discrete positions, the less will be averaging effect which may offset errors due to mechanical and magnetic deviations in manufacture.

Attempts to increase the number of poles by using sets of teeth on cooperating members subject to magnetic flux from a common winding or windings have resulted in devices using a plurality of movable members. High precision is difficult to obtain with such devices because of the individual inaccuracies of each of the members and the combined error from the cooperation of the members necessary to perform the sensing or stepping operations.

Accordingly, it is a primary object of this invention to provide variable reluctance transducing apparatus requiring only two relatively movable parts, one of which

2 may be stationary, having a minimum of individual windings and poles, a high degree of magnetic coupling between the parts, and a high number of discrete magnetic couplings that provide an averaging effect that substantially reduces errors due to mechanical and magnetic deviations in the apparatus and increases the number of positions through which the apparatus may step or sense.

The invention features variable reluctance transducing apparatus including a structure having two relatively movable members for providing a plurality of distinct magnetic flux paths, first means for modifying the reluctance of one of the flux paths, second means spaced transversely to the direction of relative motion of the members from the first means for modifying the reluctance of another of the flux paths between the members as a function of the relative positions of the members. A portion of the first means and of the second means is associated with one of the members, and a second portion of the first means and of the second means is associated with the other of the members. The first and second means are out of phase with respect to one another and the portions of the first and second means associated with each of the members are formed as a unit with that member. Means for providing in the flux paths magnetic flux transverse to the direction of relative motion of the members are associated with the members.

Other embodiments include permanent magnet means for providing magnet flux, electromagnetic means for providing magnetic flux sensing means for sensing the magnetic flux in each of the paths separately, or in combination, a pair of sets of indicia included in each of the means for modifying the reluctance of the flux paths.

DISCLOSURE OF SPECIFIC EMBODIMENTS

Other objects, features, and advantages will appear from the following description of a preferred embodiment of the invention taken together with the attached drawings hereof, in which.

Figure 1:
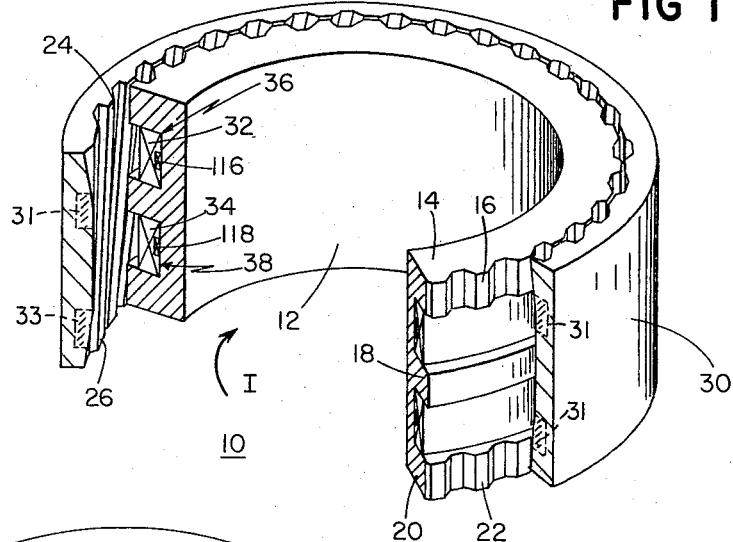
FIG. 1 is axonometric partially broken away of a variable reluctance transducer having indicia on the cylindrical interfaces of the members according to the invention.
Figure 3:
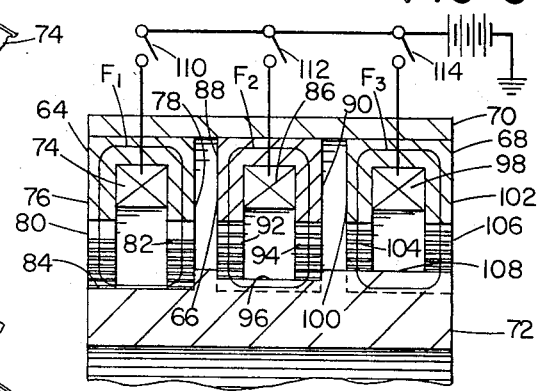
FIG. 3 is a sectional view of a portion of a transducer having three channels and arranged for operation as a stepper.
Figure 7:
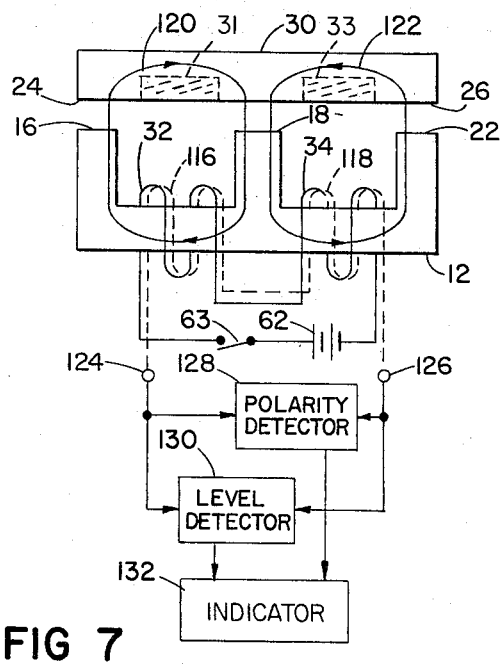
FIG. 7 is a diagrammatic view of a transducer showing windings and magnetic field paths with sensing means for use as a position encoder or resolver.
Figure 8:
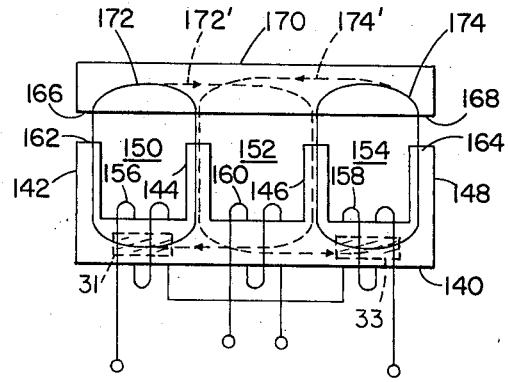
FIG. 8 is a diagrammatic view of another type of transducer showing windings and magnetic field paths.

There is shown in FIG. 1 a transducer 10 including a stator 12 having leg 14 with a set of indicia provided by teeth 16, leg 18, and leg 20 with a set of indicia provided by teeth 22. Teeth 16 and 22 circumferentially disposed on the outside of stator 12 cooperate with sets of indicia, provided by teeth 24 and teeth 26, respectively, circumferentially disposed on the inside of rotor 30, for varying the reluctance of the air gap between the rotor and stator. Legs 14, 18 and 20 extend radially outward in close proximity to rotor 30 providing paths of low magnetic reluctance with rotor 30 relative to paths from proximate areas of stator 12. Teeth 16 and 22 are in phase, while teeth 24 and 26 are out of phase with respect to each other; each set of teeth contains 360 teeth, but this number may vary, and may be unevenly spaced; only a few are shown in the drawings to avoid confusion. The in phase and out of phase relationship of teeth 16, 22, 24 and 26 may be variously arranged, as long as one of the sets of teeth 16 or 22 are out of phase with one of the sets of teeth 24 or 26. Legs 14, 18 and 20 form grooves 36 and 38 which may contain excitation windings 32 and 34 and/or sensing windings 116 and 118. Windings 32 and 34 extend in the direction of the motion of rotor 30 and provide magnetic flux transverse to the direction of motion of rotor 30 as is shown in FIGS. 3, 7 and 8. Teeth 16 and 24 are spaced from teeth 22 and 26 in the direction transverse to the direction of motion of rotor 30. Either or both stator 12 or rotor 30 may be made of material which has the properties of a permanent magnet or they may contain portions of such material, as depicted by magnets 31, 33 shown in phantom with phantom cross-hatching in FIGS. 1, 7, 8, 9 and 10.

Figure 12:
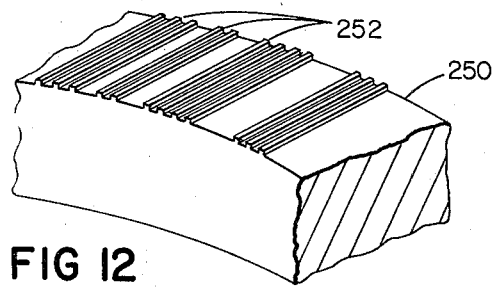
FIG. 12 is a portion of a rotor having thin plated indicia thereon.

A portion of a transducer 250 using plated metal strips 252 rather than teeth as indicia to vary the reluctance of the magnetic path is shown in FIG. 12. Of course the indicia may have properties of either high or low reluctance relative to the reluctance of the supporting area of the transducer as either characteristic may be made to vary the reluctance of the air gap between the stator and rotor.

Figure 2:
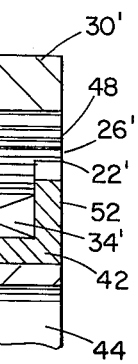
FIG. 2 is a sectional view of a portion of a transducer similar to that in FIG. 1 using two channels.

The integral E shaped cross-section of stator 12 may be duplicated by two channels 40, 42 which are mounted for operation as a unit on base 44 and may be either in abutting relationship displaying an E-like cross-section or spaced as in FIG. 2. Rotor 30' is constructed similar to rotor 30 having helical cuts 46 extending axially along the inner surface 48, the outer portions of cuts 46 forming two sets of teeth 24' and 26' which are out of phase or offset with respect to each other. Exterior walls 50, 52 and interior walls 58, 60 extend radially outward in close proximity to rotor 30' for providing paths of low magnetic reluctance with rotor 30' relative to paths from proximate areas of channels 40, 42 and base 44.

The E structure, FIG. 1, may be enlarged to provide four, five, six or any other number of legs, and the structure using two channels, FIG. 2, may be enlarged by adding any additional number of channels. Increasing the number of legs of the transducer and the number of sets of teeth used increases the precision of the transducer. For example, when the transducer is used as a stepper an increase in the number of sets of teeth provide a greater number of discrete steps; when the transducer is used as a resolver or position encoder an increase in the number of sets of teeth provides a greater number of discrete positions which may be sensed.

The prominent portions carrying the teeth, walls 14 and 20, FIG. 1, normally mounted on the stator for cooperation with teeth on the surface of the rotor, may as well be mounted on the rotor or both the rotor and stator may each carry one or more of such portions.

A stepping device may be constructed using three channels 64, 66 and 68 mounted on stator 70, and a rotor 72, FIG. 3. Channel 64 contains an excitation winding 74, two legs 76 and 78, a set of teeth 80 on leg 76, and a set of teeth 82 on leg 78. Corresponding sets of teeth 84 on rotor 72 are in phase with respect to sets of teeth 80 and 82. Similarly, channel 66 contains an excitation winding 86, two legs 88 and 90, each leg having a set of teeth 92, 94, respectively, which are in phase with each other and those on channel 64 but 120° out of phase with set of teeth 96 on rotor 72; set 96 is therefore 120° out of phase with set 84 as well. And channel 68 contains an excitation winding 98 and two legs 100 and 102, each leg having a set of teeth 104, 106, respectively, which are in phase with each other and those on channels 64 and 66 but 240° out of phase with set of teeth 108 on rotor 72. Thus, sets of teeth 84, 96, and 108 on rotor 72 are in the phase relationship of 0°, 120°, and 240°, respectively, while all the teeth on channels 64, 66, and 68 are in phase with each other and set of teeth 84 at 0°. Teeth 24' and 26' in FIG. 2 and teeth 84, 96, and 108 in FIG. 3 are not continuously helically formed but are formed in independent tracks.

Figure 4:
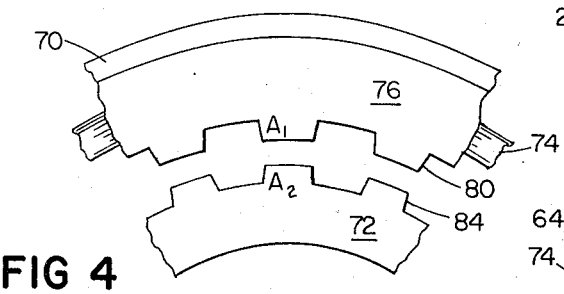
FIG. 4 is an enlarged plan view of two sets of teeth indicia which are in phase and in high reluctance relationship.
Figure 5:
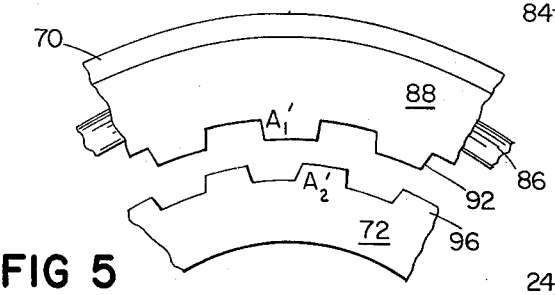
FIG. 5 is an enlarged, fragmented, plan view of two sets of teeth indicia which are 120° out of phase with the set in FIG. 4.
Figure 6:
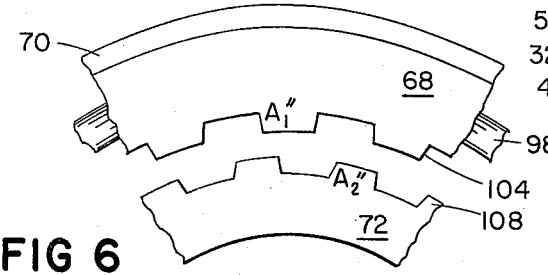
FIG. 6 is an enlarged, fragmented, plan view of two sets of teeth indicia which are 240° out of phase with the set in FIG. 4.

The relationship can be seen more clearly in FIGS. 4, 5, and 6, where energizing the windings in the sequence 86, 98, 74 drives rotor 72 in the counter-clockwise direction. Energizing winding 74 has set up the magnetic flux path $F_1$, FIG. 3, which positioned sets of teeth 80 and 84 in the 0° phase relationship in which teeth $A_1$, $A_2$, are aligned, FIG. 4. At this time sets of teeth 92 and 96 are 120° out of phase with each other, FIG. 5, and sets of teeth 104 and 108, FIG. 6, are 240° out of phase with each other. Energizing winding 86 next establishes flux path $F_2$, FIG. 3, which sets the phase relationship between sets of teeth 92 and 96 to 0°, and moves rotor 72 counter-clockwise aligning teeth $A_1'$, $A_2'$. This movement places sets of teeth 80 and 84, FIG. 4, to a phase relationship of 240° and sets of teeth 104 and 108 to a phase relationship of 120°. Now energizing winding 98 establishes flux path $F_3$, moving sets of teeth 104 and 108, FIG. 6, to the 0° phase relationship, aligning teeth $A_1''$ and $A_2''$, and moving rotor 72 counter-clockwise. Clockwise rotation of rotor 72 may be accomplished by energization of the windings in the sequence 98, 86, 74.

The energization of the windings in the stepper of FIGS. 3, 4, 5, and 6 may be accomplished by manual operation of switches 110, 112, 114 which connect a D.C. source to one end of their respective windings, the other end of the windings being grounded. The windings may be excited automatically with various programmed apparatus and sequencing devices serving as the input. In this specific embodiment employing three phase relationships a three phase A.C. source may be used to drive the stepper, directly or through controlled gates.

A position encoder may be constructed using the transducer shown in FIG. 1. Windings 32 and 34 are connected differentially, FIG. 7, while sensing windings 116 and 118, which may be included in grooves 36 and 38, are connected additively. When pulsed by a suitable power source 62 windings 32 and 34 produce opposing magnetic fields 120, 122 which induce opposite current flow in their respective sensing windings 116 and 118. Since windings 32 and 34 are identical and windings 116 and 118 are identical, the only difference in the induced voltages in sensing windings 116 and 118 will be that produced by differences in mangetic fields 120 and 122, and since members 12 and 30 are symmetrical with respect to magnetic fields 120 and 122, with the exception of the phase difference between sets of teeth 16 and 24, and 22 and 26, the voltage at terminals 124 and 126 will be a direct function of the relative positions of sets of teeth 16 and 24 and 22 and 26. Each time switch 63 is closed and opened a positive voltage induced in winding 116 and a negative voltage induced in winding 118 combine to produce a voltage at 124 and 126 whose polarity indicates which set of teeth 16 and 24 or 22 and 26 are in phase, and whose magnitude indicates the extent of their phase difference. For example, terminals 124 and 126 may connect to a polarity detector 128 and a level detector 130 whose outputs are combined in indicator 132. Indicator 132 receives a signal from polarity detector 128 representative of which set of teeth is more nearly in phase and from level detector 130 representative of the magnitude of the phase relation. Switch 63 may be replaced by a suitable electronic switching device for automatic control or switch 63 and source 62 may both be replaced by an A.C. source, in which case a circuit for synchronizing the polarity detector with the polarity of the instantaneous A.C. wave may also be added.

Adding additional magnetic paths and sets of teeth by combining many structures such as shown in the drawings increases the number of finite positions per tooth, thus for the whole transducer, and thereby improves the position encoding and/or stepping ability of the transducer. For simplicity only the basic units are shown here.

It is not necessary to have windings 32 and 34 differentially connected and windings 116 and 118 additively connected, for if one of the windings in either pair is differentially arranged the voltage at terminals 124 and 126 will be a function of the phase relationship of the sets of teeth. Alternatively a sensing circuit may be formed with a bridge circuit using windings 32 and 34 as one pair of arms and two elements of equal impedance as the other pair.

Position encoding may be accomplished using only one sensing coil with the transducer shown in FIG. 8, which includes stator 140 having four walls 142, 144, 146 and 148 forming three grooves 150, 152 and 154 which contain windings 156, 160 and 158, respectively. Windings 156 and 158 are excitation windings connected differentially in series and winding 160 is the sensing winding. Walls 142 and 148 have sets of teeth 162 and 164, respectively, that cooperate with sets of teeth 166 and 168, respectively, on rotor 170. Windings 156 and 158 provide opposing magnetic fields 172, 172′, and 174, 174′, respectively, which combine in the rotor and stator and air space that groove 152 so that sensing winding 160 is subject to a magnetic field resulting from the difference in strength of fields 172 and 172′ and 174 and 174′. Since the difference in field strength is a function of the relative displacement of sets of teeth 162 and 166 and 164 and 168, the output of sensing winding 160 indicates the relative position of the sets of teeth. The structure of FIG. 8 may be enlarged by adding more windings, walls, and grooves, may have similar structures combined with it, and may be connected with processing devices as discussed in connection with FIG. 7.

Figure 9:
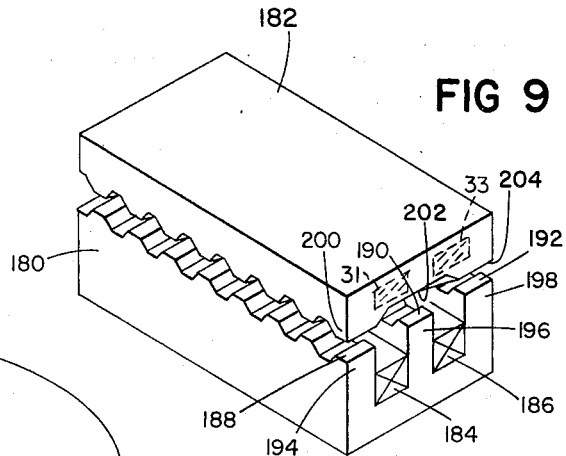
FIG. 9 is an axonometric view of a transducer capable of linear relative motion according to the invention.

The invention is not confined to rotationally, relatively movable members, FIG. 9: stator 180 and movable member 182 may be aligned for relative linear motion. The windings 184, 186 are again shown in the stationary member and extending in the direction of motion of the movable member as in the case of rotary motion transducers, but of course in either type of transducer either member may carry the windings, or each may carry windings. Teeth 188, 190 and 192 on walls 194, 196, and 198, respectively, of stator 180 cooperate with three sets of teeth 200, 202 and 204, respectively, on member 182. The direction of motion is parallel to the longitudinal axis of stator 180 and member 182 and transverse to the teeth. And again the windings extend in the direction of motion of the movable member and provide magnetic flux transverse to the direction of motion of the movable member.

When used as a stepper, a device such as that of FIG. 9 having additional sets of teeth 190 and 202 will step a distance determined by the resultant force of the magnetic field through teeth 188 and 200 and teeth 190 and 202 or of the field through teeth 190 and 202 and 192 and 204 depending upon which of windings 184, 186 is energized. Such additional sets of teeth may also be used in a position encoder.

Figure 10:
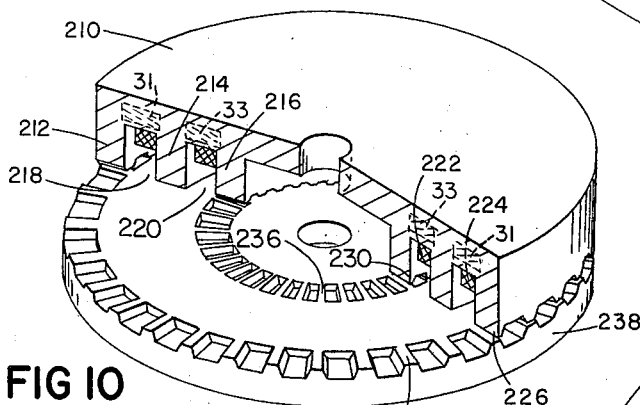
FIG. 10 is an axonometric view of a transducer capable of rotary, relative motion with indicia on the circular area of the discs.

Transducers using rotationally relatively movable members are not limited to those having the sets of indicia on cylindrical surfaces; various geometrical shapes such as cones, and other geometric solids of revolution may be used. Stator 210, FIG. 10, is a disc having three concentric walls 212, 214, and 216 forming concentric grooves 218, 220 which hold windings 222, 224, respectively. Teeth 226 and 230 on walls 212 and 216, respectively, cooperate with teeth 232 and 236 on rotor 238, respectively. Teeth 232 and 236 may be formed radially continuously or in separate bands, and all four sets of teeth may be of equal size and pitch or may increase in size and pitch as distance from the center of rotation increases. Again the sets of teeth are spaced from each other on the members and the magnetic flux from the windings is provided in the direction transverse to the direction of relative motion of the members and the windings extend in the direction of relative motion of the members.

Figure 11:
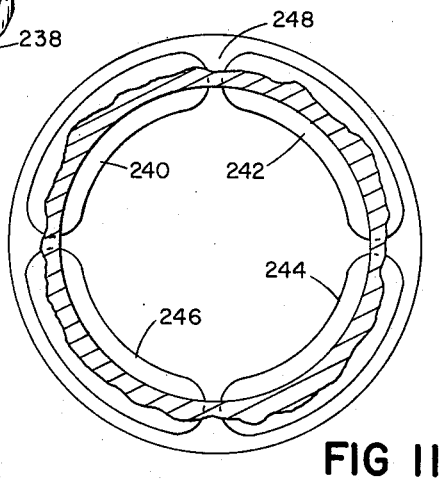
FIG. 11 is a partially broken away view of a stator with segmented windings.

The windings used need not each be a continuous toroidal coil in any particular configuration, but may be formed of a number of segments 240, 242, 244, 246 separately mounted on stator 248, FIG. 11. In operation, the excitation of the windings may be varied, for example to double the torque produced by using opposing fluxes in adjacent members to produce both pushing and pulling forces. Also the same or different current levels in different windings may be used to attain intermediate positions, or smoothly varying currents may be applied from one winding to the next to eliminate the jogging motion usually associated with steppers.

While particular embodiments of the invention have been shown and described, various modifications will be apparent to those skilled in the art. Therefore, it is not intended that the invention be limited to the disclosed embodiments or to details thereof and departures may be made therefrom within the spirit and scope of the invention as defined in the claims.

What is claimed is:

1. Rotary variable reluctant transducing apparatus comprising:
    a cylindrical rotor member;
    a cylindrical stator member concentric with and radially spaced from said rotor member;
    at least two pairs of reluctance varying means including first reluctance varying means on one of said members and second reluctance varying means on the other of said members, and third reluctance varying means on said one of said members and fourth reluctance varying means on said other of said members, said third and fourth reluctance varying means being axially spaced in the direction of the axis of rotation of said apparatus from, and out of phase with respect to said first and second reluctance varying means, said first and third reluctance varying means including a set of helical teeth segments;
    means for providing magnetic flux in at least said first and second and said third and fourth reluctance varying means including at least two electromagnetic windings including a first electromagnetic winding associated with said first and second reluctance varying means and carried by one of said members and a second electromagnetic winding associated with said third and fourth reluctance varying means and carried by one of said members, said windings being concentric with said members about the axis of rotation of said apparatus and axially spaced from each other.

2. The apparatus of claim 1 in which said means for providing magnetic flux includes a low reluctance portion carried by one of said members and extending toward the other of said members between said first and second and said third and fourth reluctance varying means.

3. The apparatus of claim 1 in which each of said second and fourth reluctance varying means includes a set of teeth.

4. The apparatus of claim 3 in which said sets of teeth are circumferentially disposed on circumferential parts of said members.

5. The apparatus of claim 3 in which the teeth of each of said sets of teeth are evenly spaced on their respective members.

6. The apparatus of claim 1 in which first and second windings are mounted on said stator member.

7. The apparatus of claim 1 further including sensing means carried by at least one of said members for sensing the magnetic flux provided by said means for providing magnetic flux.

8. The apparatus of claim 1 in which said first and second windings are formed of a plurality of segments.

9. The apparatus of claim 3 in which each of said sets of teeth have the same number of teeth.

10. Rotary variable reluctance transducing apparatus comprising:
    a rotor disc member;
    a stator disc member concentric with and axially spaced from said rotor disc member;
    at least two pairs of reluctance varying means including a first reluctance varying means on one of said members and second reluctance varying means on the other of said members, and third reluctance varying means on said one of said members and fourth reluctance varying means on the said other of said members, said third and fourth reluctance varying means being radially spaced from and out of phase with respect to said first and second reluctance varying means;
    means for providing magnetic flux in at least said first and second and said third and fourth reluctance varying means including at least two electromagnetic windings including a first electromagnetic winding associated with said first and second reluctance varying means and carried by one of said members, and a second electromagnetic winding associated with said third and fourth reluctance varying means and carried by one of said members, said first and second windings being concentric with said members about the axis of rotation of said apparatus and radially spaced from each other.

11. The apparatus of claim 10 in which said means for providing magnetic flux includes a low reluctance portion carried by one of said members and extending toward the other of said members between said first and second and said third and fourth reluctance varying means.

12. The apparatus of claim 10 in which each of said second and fourth means for varying reluctance includes a set of teeth.

13. The apparatus of claim 12 in which said sets of teeth are disposed on facing circular areas of said disc members.

14. The apparatus of claim 12 in which the teeth of each of said sets of teeth are evenly spaced on their respective members.

15. The apparatus of claim 10 in which first and second windings are mounted on said stator member.

16. The apparatus of claim 10 further including sensing means carried by at least one of said members for sensing the magnetic flux provided by said means for providing magnetic flux.

17. The apparatus of claim 10 in which said first and second windings are formed of a plurality of segments.

18. The apparatus of claim 12 in which each of said sets of teeth have the same number of teeth.

19. A translational variable reluctance transducing apparatus comprising:
    first and second relatively moveable members;
    at least two pairs of reluctance varying means including first reluctance varying means on one of said members and second reluctance varying means on the other of said members, and third reluctance varying means on said one of said members and fourth reluctance varying means on the said other of said members, said third and fourth reluctance varying means being spaced from, in a direction transverse to the direction of relative motion of the members, and out of phase with respect to said first and second reluctance varying means;
    means for providing magnetic flux in at least said first and second and said third and fourth reluctance varying means including at least two electromagnetic windings including a first electromagnetic winding associated with said first and second reluctance varying means and carried by one of said members and a second electromagnetic winding associated with said third and fourth reluctance varying means and carried by one of said members, said winding extending in a plane which is parallel to the direction of relative motion of said members and which intersects the plane of the interface of said first and second members.

20. The apparatus of claim 19 in which said means for providing magnetic flux includes a low reluctance portion carried by one of said members and extending toward the other of said members between said first and second and said third and fourth reluctance varying means.

21. The apparatus of claim 19 in which each of said second and fourth means for varying reluctance includes a set of teeth.

22. The apparatus of claim 21 in which the teeth of each of said sets of teeth are evenly spaced on their respective members.

23. The apparatus of claim 20 in which one of said members is stationary and said first and second windings are mounted on it.

24. The apparatus of claim 19 further including sensing means carried by at least one of said members for sensing the magnetic flux provided by said means for providing magnetic flux.

25. Rotary variable reluctance transducing apparatus comprising:
    a cylindrical rotor member;
    a cylindrical stator member concentric with and radially spaced from said rotor member;
    at least two pairs of reluctance varying means including first reluctance varying means on one of said members and second reluctance varying means on the other of said members, and third reluctance varying means on said one of said members and fourth reluctance varying means on the said other of said members, said third and fourth reluctance varying means being axially spaced in the direction of the axis of rotation of said apparatus from, and out of phase with respect to said first and second reluctance varying means, said first and third reluctance varying means including a set of helical teeth segments;
    means for providing magnetic flux in at least said first and second and said third and fourth reluctance varying means;
    means for sensing magnetic flux in at least said first and second and said third and fourth reluctance varying means including at least two electromagnetic windings including a first electromagnetic winding associated with said first and second reluctance varying means and carried by one of said members and a second electromagnetic winding associated with said third and fourth reluctance varying means and carried by one of said members, said windings being concentric with said members about the axis of rotation of said apparatus and axially spaced from each other.

26. The apparatus of claim 25 in which said means for providing magnetic flux includes a permanent magnet.

27. The apparatus of claim 25 in which said means for providing magnetic flux includes a low reluctance por-electromagnetic windings including a third electromagnetic winding associated with said first and second reluctance varying means and carried by one of said members, and a fourth electromagnetic winding associated with said third and fourth reluctance varying means and carried by one of said members.

28. The apparatus of claim 25 in which said means for providing magnetic flux includes a low reluctance portion carried by one of said members and extending toward the other of said members between said first and second and said third and fourth reluctance varying means.

29. The apparatus of claim 25 in which each of said second and fourth reluctance varying means includes a set of teeth.

30. The apparatus of claim 29 in which said sets of teeth are circumferentially disposed on circumferential parts of said members.

31. The apparatus of claim 29 in which the teeth of each of said sets of teeth are evenly spaced on their respective members.

32. The apparatus of claim 25 in which first and second windings are mounted on said stator member.

33. The apparatus of claim 25 in which said first and second windings are formed of a plurality of segments.

34. The apparatus of claim 29 in which each of said sets of teeth have the same number of teeth.

35. Rotary variable reluctance transducing apparatus comprising:
   a rotor disc member;
   a stator disc member concentric with and axially spaced from said rotor disc member;
   at least two pairs of reluctance varying means including a first reluctance varying means on one of said members and second reluctance varying means on the other of said members, and third reluctance varying means on said one of said members and fourth reluctance varying means on the said other of said members, said third and fourth reluctance varying means being radially spaced from and out of phase with respect to said first and second reluctance varying means;
   means for providing magnetic flux in at least said first and second and said third and fourth reluctance varying means;
   means for sensing magnetic flux in at least said first and second and said third and fourth reluctance varying means including at least two electromagnetic windings including a first electromagnetic winding associated with said first and second reluctance varying means and carried by one of said members and a second electromagnetic winding associated with said third and fourth reluctance varying means and carried by one of said members, said first and second windings being concentric with said members about the axis of rotation of said apparatus and radially spaced from each other.

36. The apparatus of claim 35 in which said means for providing magnetic flux includes a permanent magnet.

37. The apparatus of claim 35 in which said means for providing magnetic flux includes at least a pair of electromagnetic windings including a third electromagnetic winding associated with said first and second reluctance varying means and carried by one of said members, and a fourth electromagnetic winding associated with said third and fourth reluctance varying means and carried by one of said members.

38. The apparatus of claim 35 in which said means for providing magnetic flux includes a low reluctance portion carried by one of said members and extending toward the other of said members between said first and second and said third and fourth reluctance varying means.

39. The apparatus of claim 35 in which each of said second and fourth reluctance varying means includes a set of teeth.

40. The apparatus of claim 39 in which said sets of teeth are disposed on the facing circular areas of said disc members.

41. The apparatus of claim 39 in which the teeth of each of said sets of teeth are evenly spaced on their respective members.

42. The apparatus of claim 35 in which said first and second windings are mounted on said stator member.

43. The apparatus of claim 37 in which said third and fourth windings are mounted on said stator member.

44. The apparatus of claim 35 in which said first and second windings are formed of a plurality of segments.

45. The apparatus of claim 39 in which each of said sets of teeth have the same number of teeth.

46. A translational variable reluctance tranducing apparatus comprising:
   first and second relatively movable members;
   at least two pairs of reluctance varying means including first reluctance varying means on one of said members and second reluctance varying means on the other of said members, and third reluctance varying means on said one of said members and fourth reluctance varying means on the said other of said members, said third and fourth reluctance varying means being spaced from, in a direction transverse to the direction of relative motion of the members, and out of phase with respect to said first and second reluctance varying means;
   means for providing magnetic flux in at least said first and second and said third and fourth reluctance varying means;
   means for sensing magnetic flux in at least said first and second and said third and fourth reluctance varying means including at least two electromagnetic windings including a first electromagnetic winding associated with said first and second reluctance varying means and carried by one of said members and a second electromagnetic winding associated with said third and fourth reluctance varying means and carried by one of said members, said windings extending in a plane which is parallel to the direction of relative motion of said members and which intersects the plane of the interface of said first and second members.

47. The apparatus of claim 46 in which said means for providing magnetic flux includes a permanent magnet.

48. The apparatus of claim 46 in which said means for providing magnetic flux includes at least a pair of electromagnetic windings including a third electromagnetic winding associated with said first and second reluctance varying means and carried by one of said members, and a fourth electromagnetic winding associated with said third and fourth reluctance varying means and carried by one of said members.

49. The apparatus of claim 46 in which said means for providing magnetic flux includes a low reluctance portion carried by one of said members and extending toward the other of said members between said first and second and said third and fourth reluctance varying means.

50. The apparatus of claim 46 in which each of said second and fourth reluctance varying means includes a set of teeth.

51. The apparatus of claim 50 in which the teeth of each of said sets of teeth are evenly spaced on their respective members.

52. The apparatus of claim 49 in which one of said members is stationary and said first and second windings are mounted on it.

53. The apparatus of claim 48 in which one of said members is stationary and said third and fourth windings are mounted on it.

(References on following page)

References Cited

UNITED STATES PATENTS

| | | | |
|---|---|---|---|
| 2,797,346 | 6/1957 | Ranseen | 310—49 |
| 3,089,069 | 5/1963 | Thomas | 318—138 |
| 3,264,539 | 8/1966 | Sander | 318—138 |
| 3,265,911 | 8/1966 | Madsen | 310—12 |
| 3,293,459 | 12/1966 | Kreuter et al. | 310—49 |
| 3,293,460 | 12/1966 | Iwai et al. | 310—49 |
| 3,343,014 | 9/1967 | Giles | 310—49 |
| 3,372,291 | 3/1968 | Lytle et al. | 310—49 |
| 3,401,285 | 9/1968 | French et al. | 310—268 X |
| 3,401,322 | 9/1968 | O'Regan | 318—138 |
| 3,417,270 | 12/1968 | Koegel | 310—49 |

WARREN E. RAY, Primary Examiner

U.S. Cl. X.R.

310—49, 67, 156, 168, 268